United States Patent
Li et al.

(10) Patent No.: US 10,887,729 B2
(45) Date of Patent: *Jan. 5, 2021

(54) EFFICIENT RISK MODEL COMPUTATIONS

(71) Applicant: PAYPAL, INC., San Jose, CA (US)

(72) Inventors: Xin Li, Shanghai (CN); Jun Zhang, Shanghai (CN); Yang Yu, Shanghai (CN); Xiaohan Yun, Palo Alto, CA (US); Chao Zhang, Shanghai (CN); Frédéric Tu, Shanghai (CN); Zhijun Ling, Shanghai (CN); Libin Sun, Shanghai (CN); Christopher Tang, Union City, CA (US)

(73) Assignee: PAYPAL, INC., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/748,148

(22) Filed: Jan. 21, 2020

(65) Prior Publication Data

US 2020/0267506 A1    Aug. 20, 2020

Related U.S. Application Data

(63) Continuation of application No. 16/234,471, filed on Dec. 27, 2018, now Pat. No. 10,542,384.

(51) Int. Cl.
*H04W 4/029* (2018.01)
*G06Q 20/32* (2012.01)
*G06F 16/906* (2019.01)
*H04W 88/06* (2009.01)

(52) U.S. Cl.
CPC .......... *H04W 4/029* (2018.02); *G06F 16/906* (2019.01); *G06Q 20/322* (2013.01); *H04W 88/06* (2013.01)

(58) Field of Classification Search
CPC ..................................... H04W 4/029
USPC ..................................... 455/456.1
See application file for complete search history.

(56) References Cited

U.S. PATENT DOCUMENTS

2013/0084859 A1    4/2013  Azar
2016/0006628 A1    1/2016  Herring et al.

*Primary Examiner* — Joel Ajayi
(74) *Attorney, Agent, or Firm* — Haynes and Boone, LLP

(57) ABSTRACT

A method is provided that includes accessing, by a server provider server of a service provider, a database storing associations between network addresses and locations. Additionally, the method includes determining a subset of the database corresponding to a first network address, each association included in the subset corresponding to an association between the first network address and a respective location. The method also includes in response to determining that the subset of the database satisfies one or more clustering criteria, calculating a representative location corresponding to the first network address, and storing an association between the first network address and the representative location in a second database.

19 Claims, 5 Drawing Sheets

EFFICIENT RISK MODEL COMPUTATIONS

CROSS-REFERENCE TO RELATED APPLICATION

This application is a continuation of U.S. patent application Ser. No. 16/234,471, filed Dec. 27, 2018, and issued as U.S. Pat. No. 10,542,384 on Jan. 21, 2020, which is incorporated by reference in its entirety.

BACKGROUND

Online transactions and transactions involved mobile devices in particular are becoming more and more prevalent today. Mobile devices typically include location modules that are configured to determine location information of the devices. In order to transact with certain service providers and/or other entities, mobile devices may reveal their network addresses and location information to the service providers. As such, there exists certain databases that are able to map network addresses to particular locations. However, since network addresses can be constantly re-assigned and location information related to certain devices may be subject to rapid change, such databases may not be current in their network address to location information mappings.

Figure 1:
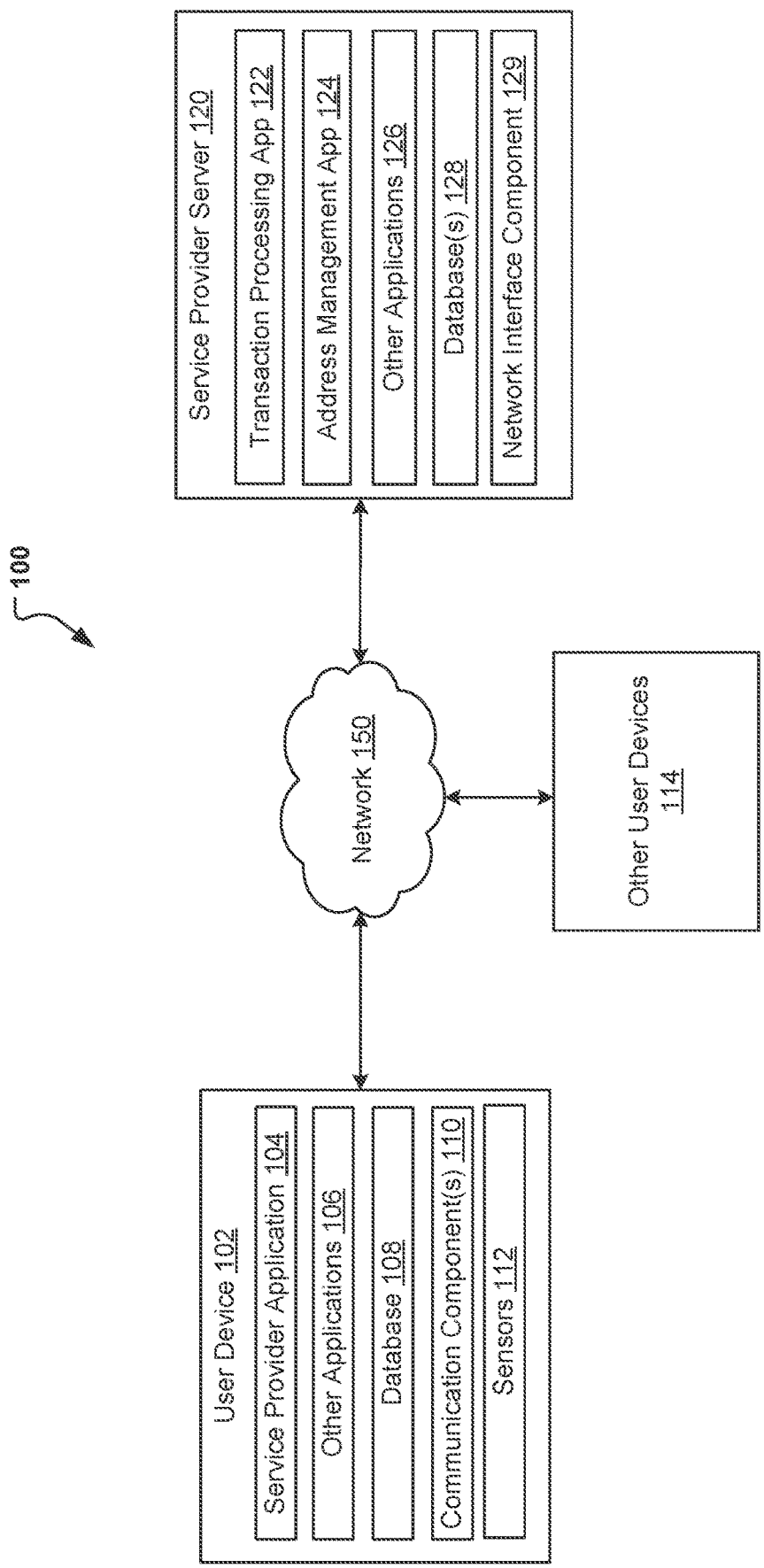
FIG. 1 is a block diagram of a networked system suitable for implementing the processes described herein for calculating representative location information for network addresses.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Systems and methods are provided for calculating representative location information for network addresses. According to a particular embodiment, a service provider server may be configured to process various transaction requests initiated by various user devices. In submitting a transaction request, a particular user device may include a network address (e.g., an Internet Protocol (IP) address) corresponding to the particular user device and location information (e.g., Global Positioning Satellite (GPS) data) corresponding to the particular user device. Furthermore, the service provider server may also determine the type of data connection that was used to submit the transaction request (e.g., cellular data connection, Wi-Fi connection, etc.). As such, the service provider server may maintain a first database that maps or stores associations between network addresses, location information, and data connection types corresponding to processed transaction requests. For example, a given network address (e.g., 192.168.2.1) may be associated with a set of latitude and longitude coordinates (e.g., (50.343, 40.234)) and a data type indicating a Wi-Fi connection. In some embodiments, the service provider server may correspond to a payment provider server of a payment provider, and the transaction requests may correspond to payment requests initiated by the user devices. Further, it will be appreciated that the systems, methods, and ideas discussed within the present disclosure may be applied to any type of service provider server that collects and/or otherwise obtains network address and location information.

Within the first database, a given network address may be associated with multiple different location information. For example, the same given network address may be assigned to different user devices and different points in time. Further, the different user devices may be located in different geographic locations when submitting their respective transaction requests. Thus, the service provider records different location information for the given network address in the first database.

According to certain embodiments, the service provider server may attempt to determine a single representative location for each network address stored in the first database. In general terms, for each particular network address, the service provider server may determine whether it is able to accurately calculate representative location information corresponding to the particular network address. If the service provider determines that it is indeed able to accurately calculate the representative location information, the service provider server stores an association between the particular network address and the calculated representative location information as a database entry in a second database.

If the service provider determines that it is not able to accurately calculate the representative location information, the service provider server may access a third-part database that stores associations between network addresses and location information based on other types of transactions and/or network traffic. The service provider server may access the third-party database using the particular network address as a key and/or index into the third-party database. As a result, the service provider server may identify a database entry in the third-party database that stores an association between the particular network address and third-party location information corresponding to the particular network address. The service provider server may designate the third-party location information as the representative location information for the particular network address and store an association between the particular network address and the representative location information as a database entry in the second database.

In view of the above descriptions, it will be appreciated that the second database stores associations between network addresses (that are included in the first database) and representative location information that have been determined by the service provider server. As such, each network address in the second database may map to a single representative location information.

The service provider server may employ various techniques for accurately calculating the representative location information corresponding to the particular network address. According to a particular embodiment, the service provider server may first access the first database and filter out entries storing network addresses that are associated with data types corresponding to cellular data connections. This filtering may be performed due to the fact that devices using cellular data tend to change geographic locations relatively rapidly (e.g., a mobile phone in a moving vehicle), thereby rendering their corresponding location information relatively imprecise and unreliable.

Subsequently, for each network address in the resulting filtered subset, the service provider server may identify a first subset of database entries from the filtered subset that are associated with the network address. To this end, the service provider server may evaluate whether it is able to accurately calculate representative location information for the network address based on various clustering criteria. For example, the service provider server may determine whether a number of database entries in the first subset satisfies a number threshold (e.g., whether the number of database entries is greater than or equal to the number threshold). If not, the service provider server determines that it is not able to accurately calculate representative location information for the network address.

Additionally, the service provider server may also determine whether a cluster density associated with respective location information includes in the first subset satisfies a density threshold. In order to determine the cluster density, the service provider server may calculate a centroid of the respective location information included in the first subset. Further, for each respective location information in the first subset, the service provider server may determine a respective distance from the centroid. As such, the maximum distance from the respective distances is designated as the cluster density by the service provider server. Further, if the cluster density fails to satisfy the density threshold (e.g., the cluster density is less than the cluster density threshold), the service provider server may again determine that it is not able to accurately calculate representative location information for the network address.

In certain embodiments, if the service provider server determines that first subset satisfies both the number threshold and the density threshold, the service provider server may proceed to calculating the representative location information for the network address. For example, in implementations where the respective location information in the subset are coordinates, the service provider server may average all of the coordinates included in all the respective location information to determine the representative location information (e.g., the representative coordinates). As previously discussed, the service provider server may store an association between the network address and the representative location information (e.g., the representative coordinates) in the second database.

Further, the service provider server may also calculate an accuracy measure corresponding to the representative location information. The accuracy measure may indicate a confidence level in the estimation of the representative location information. As such, the accuracy measure may be taken into consideration when making business decisions. For example, the accuracy measure may be considered when assessing the risk of a particular transaction that considers network address and location information. In some embodiments, the accuracy measure may be determined based on one or more nearest neighbor locations to the representative location information. In some embodiments, the nearest neighbor locations may be determined from the location information included in the first subset of the first database. In other embodiments, the nearest neighbor locations may be determined from the location information included in the first database, second database, third-party database, and/or a combination thereof.

FIG. 1 is a block diagram of a networked system 100 for implementing the processes described herein, according to an embodiment. As shown, system 100 may include or implement a plurality of devices, computers, servers, and/or software components that operate to perform various methodologies in accordance with the described embodiments. Example devices, computers, and servers may include mobile devices, wearable devices, stand-alone devices, desktop computers, laptop computers, and enterprise-class servers, executing an operating system (OS) such as a MICROSOFT® OS, a UNIX® OS, a LINUX® OS, or another suitable device and/or server based OS. It will be appreciated that the devices, computers, and/or servers illustrated in FIG. 1 may be deployed differently and that the operations performed and/or the services provided by such devices, computers, and/or servers may be combined or separated for a given embodiment and may be performed by a greater number or fewer number of devices, computers, and/or servers. Furthermore, one or more of the devices, computers, and/or servers may be operated and/or maintained by the same or different entities.

System 100 includes a user device 102 configured to communicate with a service provider server 120 over a network 150. The user device 102 and the service provider server 120 may each include one or more processors, memories, and other appropriate components for executing computer-executable instructions such as program code and/or data. The computer-executable instructions may be stored on one or more computer readable mediums or computer readable devices to implement the various applications, data, and steps described herein. For example, such instructions may be stored in one or more computer readable media such as memories or data storage devices internal and/or external to various components of system 100, and/or accessible over network 150.

The user device 102 may be implemented as a communication device that may utilize appropriate hardware and software configured for wired and/or wireless communication with the service provider server 120 and/or the POS device 142. In certain implementations, the user device 102 may be a mobile phone, tablet, electronic wearable, laptop computer, desktop computer, and/or any other type of computing device usable by a user. The user device 102 may be configured to accept various forms of payment (such as via the service provider application 104), including, but not limited to credit card payments, debit card payments, loyalty card payments, gift card payments, store card payments, and/or payment made by accessing a digital wallet.

The user device 102 may include a service provider application 104, other applications 106, a database 108, communication components 110, and sensors 112. The service provider application 104 and other applications 106 may correspond to executable processes, procedures, and/or applications with associated hardware. In other embodiments, user device 102 may include additional or different components having specialized hardware and/or software to perform operations associated with the service provider application 104 and/or the other applications 106.

The service provider application 104 may be provided and maintained by a service provider associated with the service provider server 120. The service provider application 104 may provide an interface for a user of the user device 102 to initiate or perform various types of transactions offered and/or facilitated by the service provider. In certain embodiments, the service provider application 104 may provide an interface for the user to effect digital payments using an account that the user maintains with the service provider. As such, the user may initiate one or more purchase requests via the service provider application 104, and the service provider application 104 may communicate with the service provider server 120 to process the purchase requests. According to certain embodiments, each transaction request initiated by the service provider application 104 may include a network address corresponding to the user device 102, location information corresponding to the user device 102, and a data connection type used by the user device 102 to communicate with the service provider server 120 via the network 150. The network address may be an Internet Protocol (IP) address, Media Access Control (MAC) address and/or corresponding to any other type of network addressing protocol. The location information may include GPS coordinates, other type of coordinates, landmark information, and/or any other type of data used to determine location. The data connection type include a cellular data connection type, a Wi-Fi data connection type, a Bluetooth data connection, and/or any other data connection type.

The user device 102 may execute the other applications 106 to perform various other tasks and/or operations corresponding to the user device 102. For example, the other applications 106 may include security applications for implementing client-side security features, programmatic client applications for interfacing with appropriate application programming interfaces (APIs) over network 150, or other types of applications. The other applications 106 may also include additional communication applications, such as email, texting, voice, and instant messaging (IM) applications that enable a user to send and receive emails, calls, texts, and other notifications through the network 150. In various embodiments, the other applications 106 may include location detection applications, such as a mapping, compass, and/or global positioning system (GPS) applications, which may be used to determine a location of the user device 102. The other applications 106 may include social networking applications. Additionally, the other applications 106 may include device interfaces and other display modules that may receive input and/or output information. For example, the other applications 106 may include a graphical (GUI) configured to provide an interface to the user.

In some embodiments, the other applications 106 may include a social media application that enables the user to interface with a social media platform provided by a third-party service provider. Further, the service provider may be integrated with the social media platform (and/or otherwise be in communication with the social media platform). For example, the service provider server 120 may be in communication with one or more servers or devices of the social media platform.

The user device 102 may further include a database 108, which may be stored in a memory and/or other storage device of the user device 102. The database 108 may include, for example, identifiers (IDs) such as operating system registry entries, cookies associated with the digital wallet application 104 and/or other applications 106, IDs associated with hardware of the communication component 110, IDs used for payment/user/device authentication or identification, and/or other appropriate IDs. The database 108 may also include information corresponding to one or purchase transactions of the user who has purchased goods or services from one or more merchants, browsing histories of the user, or other types of user information. In certain embodiments, the user device 102 may also include information corresponding to payment tokens, such as payment tokens generated by the service provider server 120. Further, the database 108 may store login credentials (e.g., such as to login to an account with the service provider and/or other accounts with other service providers), identification information, biometric information, and/or authentication information of the user.

The user device 102 may also include at least one communication component 110 configured to communicate with various other devices such as the second user device 114 and/or the service provider server 120. In various embodiments, communication component 110 may include a Digital Subscriber Line (DSL) modem, a Public Switched Telephone Network (PTSN) modem, an Ethernet device, a broadband device, a satellite device and/or various other types of wired and/or wireless network communication devices including microwave, radio frequency, infrared, Bluetooth, Bluetooth low-energy, near field communication (NFC) devices, and/or the like.

The user device 102 may also include one or more hardware sensors 112 to determine user inputs from the user, motion of the user device 102, biometric information associated with the user, and/or various environmental data associated with the user device 102. The sensors 112 may include, but are not limited to, gyroscopes, cameras, microphones, accelerometers, barometers, thermometers, compasses, magnetometers, light detectors, proximity sensors, fingerprint sensors, pedometers, and heart rate monitors.

The other user devices 114 may be implemented as a communication devices that utilize appropriate hardware and software configured for wired and/or wireless communication with the user device 102 and/or the service provider server 120. In certain implementations, the other devices 114 may be mobile phones, tablets, electronic wearables, laptop computers, desktop computers, and/or any other type of computing devices. The other user devices 114 may also be configured to accept various forms of payment including, but not limited to credit card payments, debit card payments, loyalty card payments, gift card payments, store card payments, and/or payment made by accessing a digital wallet.

According to certain embodiments, the other user devices 114 may operate similarly to the user device 102. For instance, the other user device 114 may also initiate respective transaction requests that may be processed by the service provider server 120. As such, the transaction requests may each include a network address, location information, and a data connection type.

The service provider server 120 may be maintained, for example, by the service provider, which may provide transaction processing services for the merchant and/or users of the service provider application 104 (e.g., payment processing). In one example, the service provider server 120 may be provided by PAYPAL, Inc. of San Jose, Calif. USA. However, in other embodiments, the service provider server 120 may be maintained by or include a financial service provider, social networking service, email or messaging service, media sharing service, and/or other service provider, which may provide payment processing services.

The service provider server 120 includes a transaction processing application 122. The transaction processing application 122 may be configured to facilitate digital payments for users of the service provider, such as the users of user device 102 and the other user device 102. According to a particular embodiment, the transaction processing application 122 may receive the transaction requests initiated by the users. Based on the transaction requests, the transaction processing application 122 may store, in a first database (e.g., included in database(s) 128), associations between network addresses, location information, and data connection types corresponding to the transaction requests.

The service provider server 120 also includes an address management application 124. The address management application may configured to determine representative location information for one or more of the network addresses stored in the first database. As such, the address management application 124 may store associations between network addresses and representative location information in a second database, as described in more detail below with reference to FIG. 2.

The service provider server 120 may execute the other applications 126 to perform various other tasks and/or operations corresponding to the service provider server 120. For example, the other applications 126 may include security applications for implementing server-side security features, programmatic client applications for interfacing with appropriate application programming interfaces (APIs) over network 150, or other types of applications. The other applications 126 may also include additional communication applications, such as email, texting, voice, and instant messaging (IM) applications that enable a user to send and receive emails, calls, texts, and other notifications through the network 150. In various embodiments, the other applications 126 may include location detection applications, such as a mapping, compass, and/or global positioning system (GPS) applications. The other applications may 126 include social networking applications. Additionally, the other applications 126 may include device interfaces and other display modules that may receive input and/or output information. For example, the other applications 126 may include a GUI configured to provide an interface to a user.

The service provider server 120 may further include one or more databases 138, which may be stored in a memory and/or other storage device of the service provider server 120. The database(s) 138 may include, for example, IDs such as operating system registry entries, cookies associated with the transaction processing application 122, biometric information, IDs associated with hardware of the network interface component 129, IDs used for payment/user/device authentication or identification, and/or other appropriate IDs.

In various embodiments, the service provider server 120 also includes at least one network interface component 129 that is configured to communicate with the user device 102 and/or the other user devices 114 via the network 150. The network interface component 129 may comprise a DSL modem, an Ethernet device, a broadband device, a satellite device and/or various other types of wired and/or wireless network communication devices including microwave, RF, and IR communication devices.

The network 150 may be implemented as a single network or a combination of multiple networks. For example, in various embodiments, the network 150 may include the Internet or one or more intranets, landline networks, wireless networks, and/or other appropriate types of networks. Thus, the network 150 may correspond to small scale communication networks, such as a private or local area network, or a larger scale network, such as a wide area network or the Internet, accessible by the various components of system 100.

Figure 2:
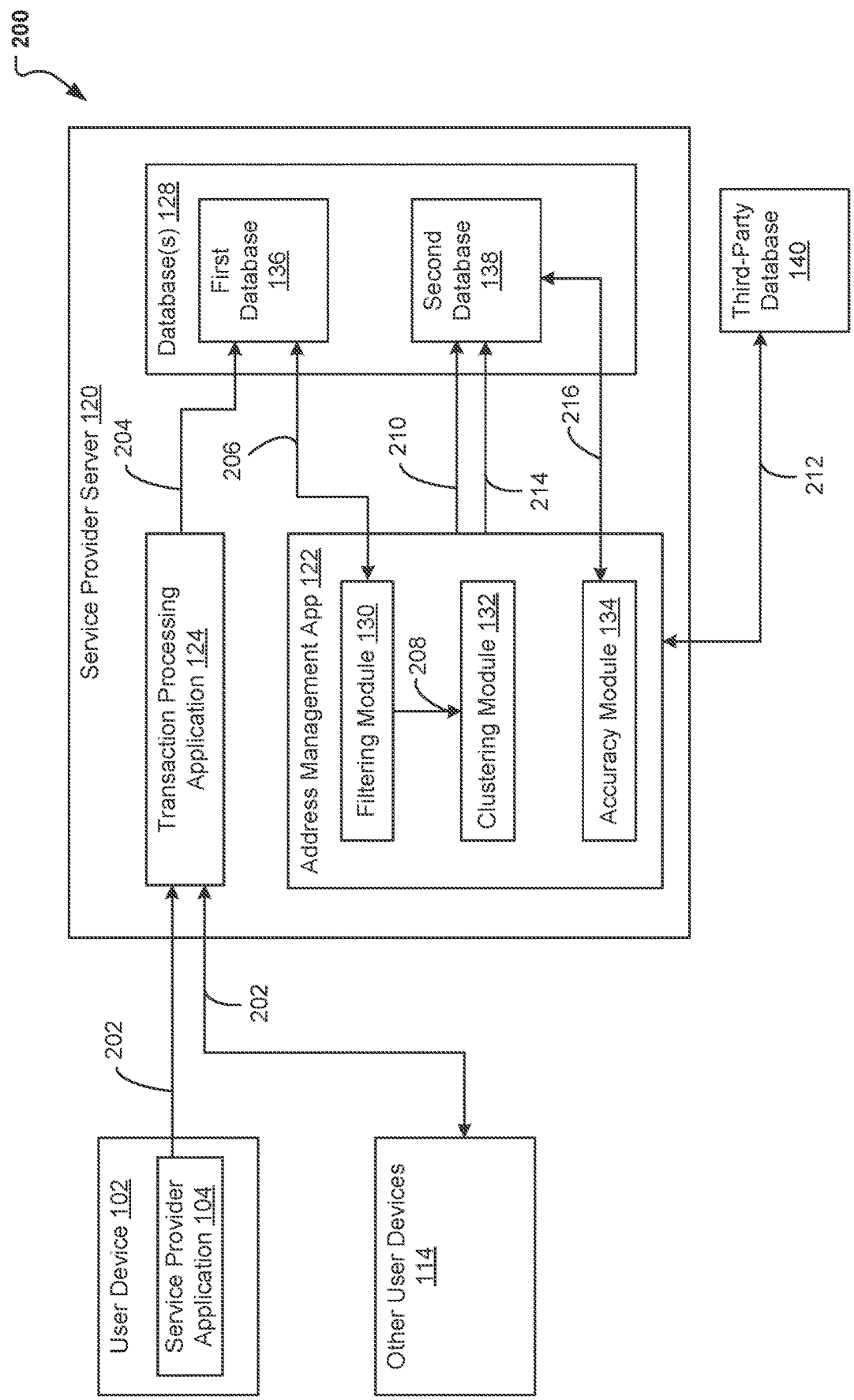
FIG. 2 is an is an example data flow diagram for calculating representative location information for network addresses, according to an embodiment.

FIG. 2 illustrates a data flow 200 for calculating representative location information for network addresses. At step 202, the user device 102 and the other user devices 114 may transmit transaction requests to the service provider server 120. As previously discussed, each transaction request may include and/or may be accompanied by a network address corresponding to the transmitting device, location information corresponding to the transmitting device, and a data connection type used by the transmitting device to transmit the transaction request.

At step 204, the transaction processing application 122 may store associations between the network addresses, location information, and data connection types in a first database 136 included in the database(s) 128. Example database entries in the first database are shown in Table 1 below. In certain embodiments, the first database may include database entries that were obtained from various types of transaction requests, such as payment requests, website visits, online advertisement clicks, and/or the like.

TABLE 1

| ID | IP Address | Latitude | Longitude | Connection Type |
|----|------------|----------|-----------|-----------------|
| 1  | 192.168.1.1 | 50.343  | 40.234    | Cellular        |
| 2  | 242.154.1.1 | 34.789  | 25.234    | Wi-Fi           |
| 3  | 51.11.1.1   | 41.823  | 26.345    | Wi-Fi           |

At step 206, the address management application 124 may access the first database 136 and apply a filtering module 130 to the database entries of the first database 136. The filtering module 130 may be configured to filter out database entries of the first database 136 that include the cellular data connection type. Thus, the output of the filtering module 130 may be a subset of the database entries of the first database 136 in which none of the database entries in the subset include the cellular data connection type.

At step 208, the filtering module 130 provides the subset to the clustering module 132. The clustering module 132 may be configured to identify network addresses having corresponding database entries in the subset that satisfy certain clustering criteria. In other words, the clustering module 132 may, for a given network address, identify one or more database entries in the subset that include the given network address. The identified one or more database entries may be referred to as the cluster. As such, the clustering module 132 may then determine if the cluster satisfies the clustering criteria. Further, the clustering module 132 may repeat this process for each network address included in the subset. In certain implementations, the given network address may have multiple corresponding clusters. In such cases, the cluster having the most database entries may be selected. As such, the remaining processes described with respect to the cluster module 132 may be applied to the selected cluster.

According to certain embodiments, the clustering criteria may include a number threshold and a cluster density threshold. For example, the clustering module 132 may determine a number of database entries included in the cluster. Further, the clustering module 132 may determine whether the number of database entries is greater than or equal to the number threshold.

Additionally, the clustering module 132 may calculate a cluster density corresponding to the cluster. For instance, the clustering module 132 may analyze all of the location information stored in the cluster to determine a centroid of the location information. In particular, the clustering module 132 may determine the centroid based on the location coordinates stored in the database entries of the cluster. Furthermore, the clustering module 132 may determine respective distances, from the centroid, of each location information of each database entry of the cluster (e.g., the distances between each location coordinates of each database entry in the cluster and the coordinates of the centroid). The clustering module 132 then identifies the maximum distance out of the respective distances (e.g., the greatest distance) as the cluster density of the cluster. Accordingly, the clustering module 132 may determine whether the cluster density is less than cluster density threshold.

Accordingly, if the clustering module 132 determines, for the cluster, that the number of database entries is greater than or equal to the number threshold and that the cluster density is less than the cluster density threshold, the clustering module 132 may determine that representative location information corresponding to the given network address can be accurately calculated. In certain embodiments, the clustering module 132 may calculate the representative location information for the given network address by averaging all of the location information in cluster. For example, the clustering module 132 may average all of the latitude coordinates in the cluster and all of the longitude coordinates in the cluster, thereby resulting in a representative coordinate location for the given network address.

At step 210, the address management module 124 may store an association between the given network address and its corresponding representative location information as a database entry in a second database 138. Similarly, the address management module 124 may store, as database entries in the second database 138, associations between any other network addresses and corresponding representative location information calculated from the subset of database entries of the first database 136.

Referring back to step 208, in certain embodiments, the clustering module 132 may identify a second network address for which the clustering module 132 is unable to determine a cluster or for which its corresponding cluster does not satisfy the clustering criteria. In such embodiments, at step 212, the address management module 124 may access a third-party database 140 that also stores associations between network addresses and location information. The address management module 124 may use the second network address as a key into the third-party database 140 to determine third-party location information corresponding to the second network address. At step 214, the address management module 124 may store an association between the second network address and the third-party location information, thereby in effect designating the third-party location information as the representative location information for the second network address.

Furthermore, the address management application 122 may identify one or more entries in the third-party database 140 that correspond to network addresses that do not have any corresponding entries in the second database 138 (e.g., this could also be performed in step 212). As such, the address management application 122 may store the identified one or more entries of the third-party database 140 as entries in the second database 138 (e.g., this could also be performed in step 214). Thus, the location information included in the identified entries may in effect be designated as representative location information for their associated network addresses.

In other embodiments, the third-party database 140 may store additional location information, other than coordinates, associated with its stored network addresses. For example, the additional location information may include, but is not limited to county, state, city, zip code, and/or the like. As such, the address management module 124 may be configured to enhance certain database entries in the second database 138 with one or more of the additional location information. For example, a given network address included in the second database 138 may be used as a key into the third-party database 140 to determine any corresponding additional location information, which may be added to the database entry of the second database 138 corresponding to the given network address.

At step 216, the accuracy module 134 may be configured to determine an accuracy measure for each of the representative location information stored in the second database 138. The accuracy measures may indicate a confidence level with respect to the estimation of the representative location information stored in the second database 138. According to a particular embodiment, the accuracy measure for a particular network address stored in the second database 138 may be calculated by first searching for a predetermined number of nearest neighbor locations to the representative location information. The search may be conducted with respect to all of the representative location information stored in the second database 138. As such, the accuracy module 134 may calculate the accuracy measure to be $1/(1+\text{avg\_dist})$, where avg_dist is the average distance between the nearest neighbor locations and the representative location information. In certain embodiments, the address management application 124 may be configured to further associate the calculated accuracy measures with each corresponding representative location information stored in the second database 138.

As a result of the data flow 200 illustrated in FIG. 2, the database entries stored in the second database 138 may correspond to associations between network addresses and corresponding representative location information and accuracy measures. Thus, each network address in the second database 138 may have only a single corresponding database entry in the second database 138. In other words, each network address in the second database 138 may be associated with a single corresponding location in the second database 138 (along with an accuracy measure).

Though not illustrated in FIG. 2, the entries stored by the second database 138 (e.g., the associations between the network addresses and representative location information) may be used during risk assessments of payment transactions and/or other types of transactions. For example, the service provider server 120 may receive a request for a payment transaction from a device having a particular network address. The request may further include and/or otherwise be associating with location information. As such, the service provider server 120 may access the second database 138 using the particular network address as a key to determine a particular representative location information corresponding to the particular network address. The service provider server 120 may then compare the particular representative location information with the location information associated with the request. Based on the comparison, the service provider server 120 may determine a risk level associated with the request.

For example, if the service provider server 120 determines that the representative location information is within a predetermined distance from the location information associated with the request, the service provider server 120 may assess a relatively low risk level associated with the request. If the service provider server 120 determines that the representative location information is not within the predetermined distance from the location information, the service provider server 120 may assess a relatively high risk level of the request being associated with fraudulent activity.

Figure 3:
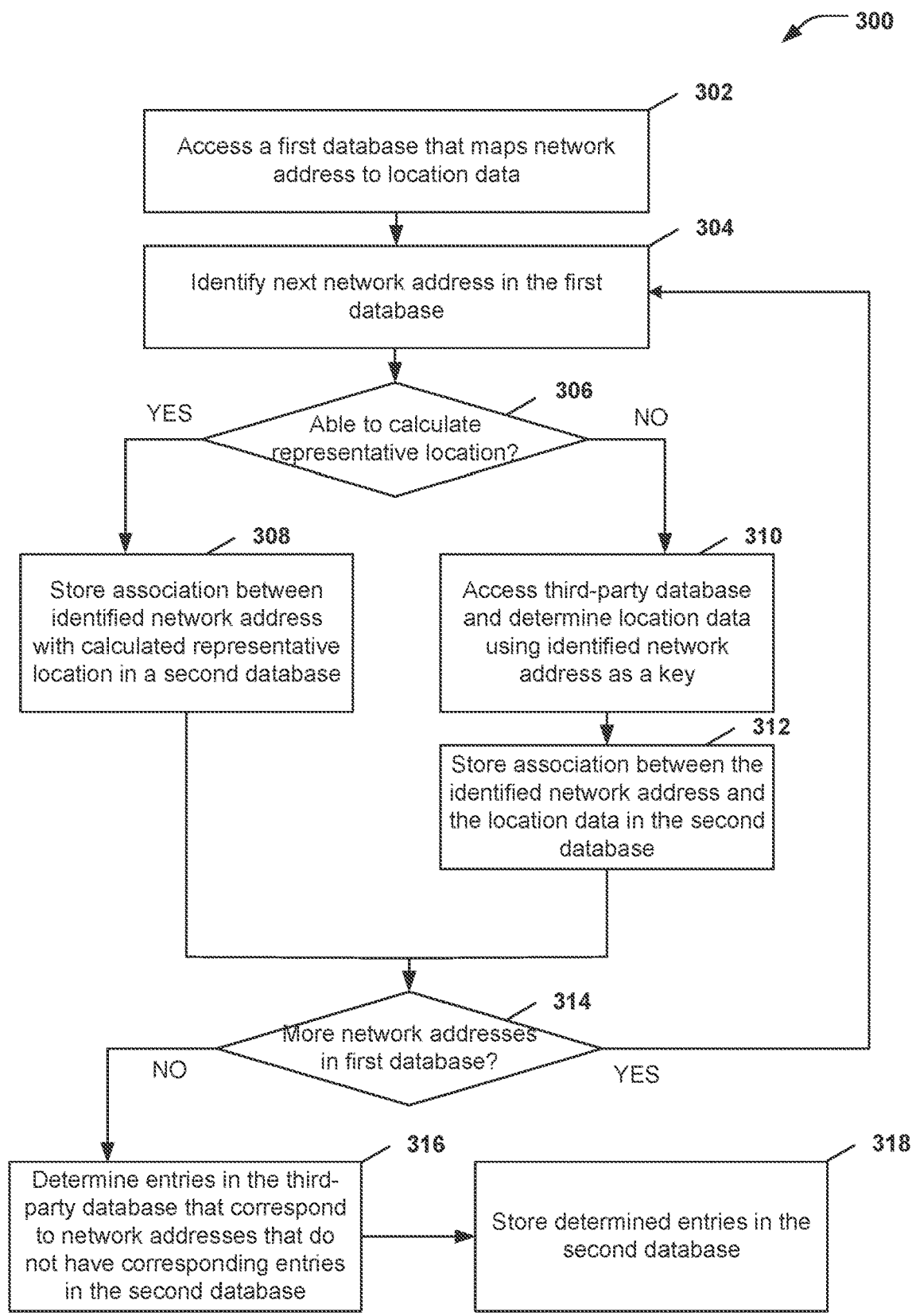
FIG. 3 is an example flow diagram for selecting how representative location information is determined, according to another embodiment.

FIG. 3 illustrates a flow diagram of a method 300 for selecting how representative location information is determined. Note that one or more steps, processes, and methods described herein may be omitted, performed in a different sequence, or combined as desired or appropriate.

The method 300 may being in step 302, where a service provider server, such as the service provider server 120, may access a first database that maps network address to corresponding location information (e.g., the first database 136). At step 304, the service provider server 120 may identify the next network address in the first database 136 to analyze, and at step 306, the service provider server 120 may determine whether representative location information for the identified network address can be accurately calculated.

At step 308, if the service provider server 120 determines that the representative location information can be accurately calculated for the identified network address, the service provider server 120 may calculate the representative location information and store, in a second database (e.g., second database 138), an association between the identified network address and the calculated representative location information. The method 300 may then proceed to step 314, where the service provider server 120 may determine if there are additional network addresses in the first database 136 to be analyzed. If so, the method 300 may proceed back to step 304. If not, the method 300 ends.

At step 310, if service provider server 120 determines that the representative location information cannot be accurately calculated for the identified network address, the service provider server 120 may access a third-party database (e.g., third-party database 140 and determine third-party location information using the identified network address as a key to the third-party database 140. As previously discussed, the third-party location information may be designated by the service provider server as the representative location information for the identified network address.

Thus, at step 312, the service provider server 120 may store, in the second database 138, an association between the identified network address and the third-party location information (that has been designated as the representative location information). The method 300 may then proceed to step 314, where the service provider server 120 may determine if there are additional network addresses in the first database 136 to be analyzed. If so, the method 300 may proceed back to step 304. If not, the method 300 proceeds to step 316.

At step 316, the service provider server 120 may determine and/or identify entries in the third-party database 140 that correspond to network addresses that do not have corresponding entries in the second database 138. At step 318, the service provider server may store the determined entries of the third-party database 140 as entries in the second database 138.

Figure 4:
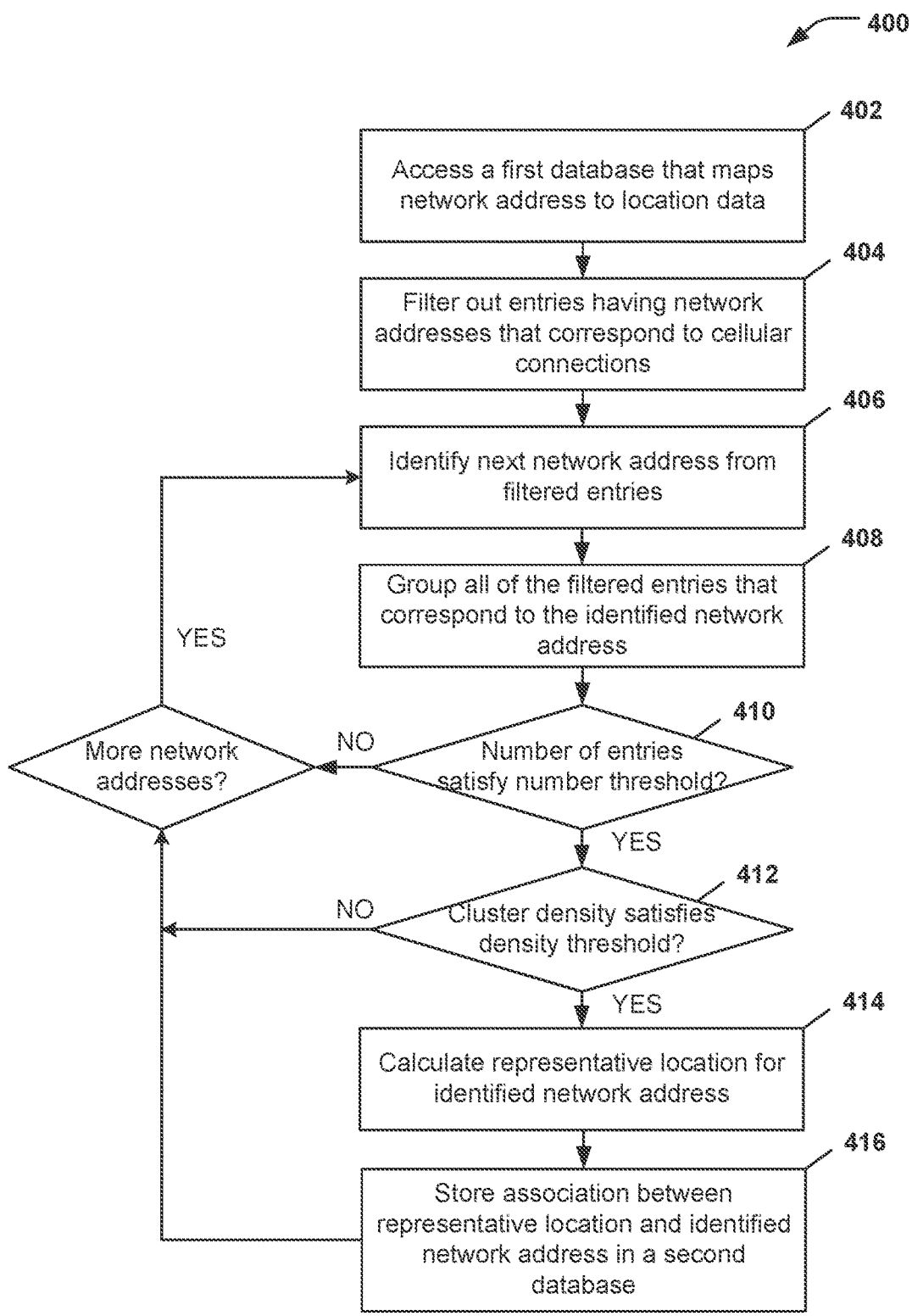
FIG. 4 is an example flow diagram for calculating representative location information for network addresses, according to an embodiment.

FIG. 4 illustrates a flow diagram of a method 400 for calculating representative location information for network addresses. Note that one or more steps, processes, and methods described herein may be omitted, performed in a different sequence, or combined as desired or appropriate.

The method 400 may begin in step 402, where a service provider server, such as service provider server 120 may access a first database (e.g., first database 136) that maps network addresses to corresponding location information. At step 404, the service provider server 120 may filter out entries in the first database 136 that include network addresses that correspond to cellular data connections. Further, at step 406, the service provider server 120 may identify a next network address to analyze from the filtered entries.

At step 408, the service provider server 120 may group all of the entries from the filtered entries that include and/or correspond to the identified network address. At step 410, the service provider server 120 may determine whether a number of entries in the group satisfy a number threshold. If so, the method 400 proceeds to step 412. If the service provider server 120 determines that the number of entries in the group fails to satisfy the number threshold, the method 400 may proceed to step 418.

At step 412, the service provider server 120 may calculate a cluster density corresponding to the group and determine if the cluster density satisfies a density threshold. If so, the method 400 proceeds to step 414. If the service provider server 120 determines that the cluster density fails to satisfy the density threshold, the method 400 may proceed to step 418.

At step 414, the service provider server 120 may calculate representative location information corresponding to the identified network address. As previously discussed, the calculation may include averaging the location information included in the group of all the filtered entries that correspond to the identified network address. As such, at step 416, the service provider server 120 may store an association between the representative location information and the identified network address in a second database, such as database 138.

At step 418, the service provider server 120 may determine whether there are any additional network addresses from the filtered entries of the first database to be analyzed. If so, the method 400 may proceed back to the step 406. If the service provider server 120 determines that there are no more additional network addresses to be analyzed, the method 400 may end.

Figure 5:
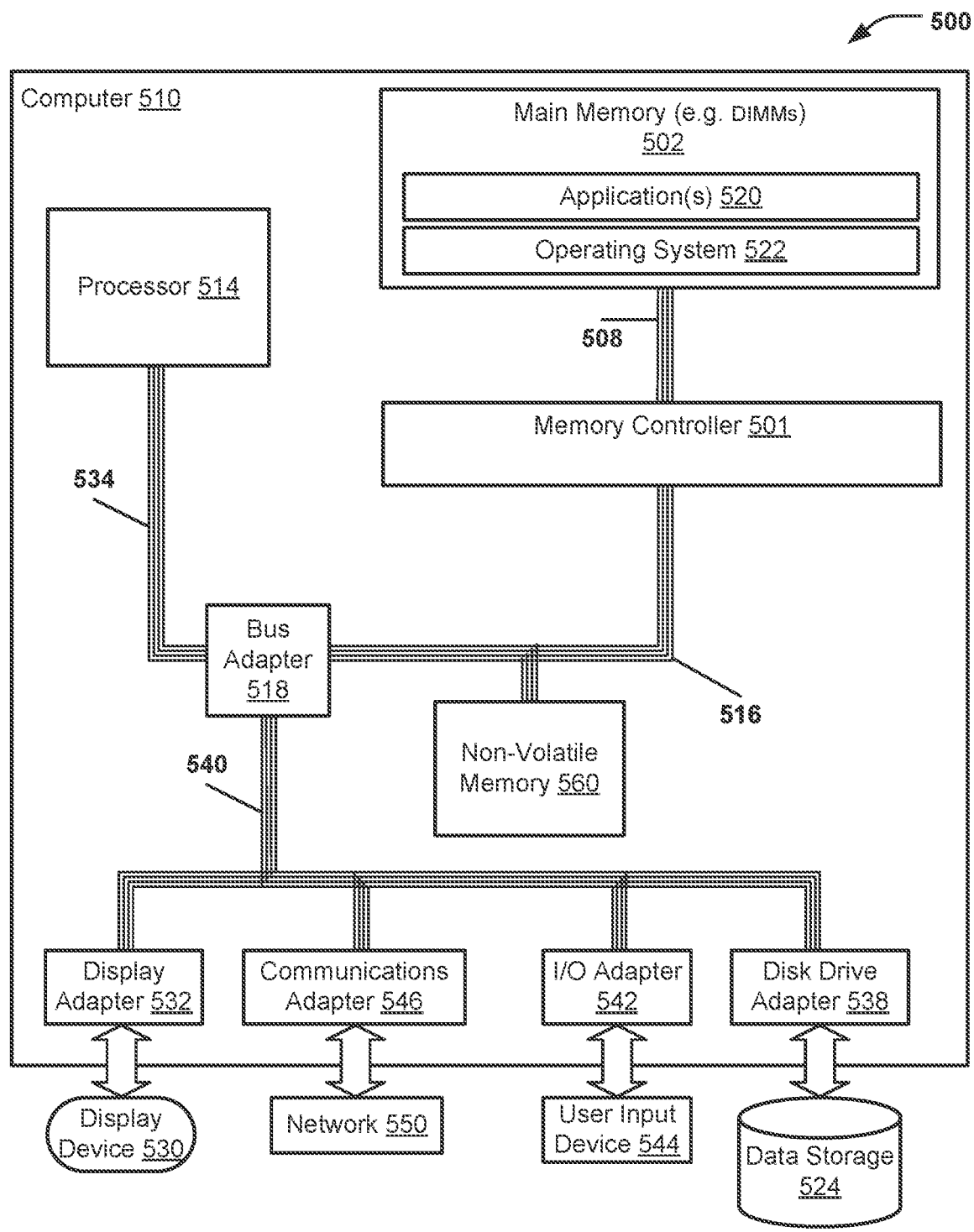
FIG. 5 is a block diagram of a computer system suitable for implementing one or more components in FIG. 1-4, according to an embodiment.

FIG. 5 is a block diagram of a computer system 500 suitable for implementing one or more components in FIG. 1, according to an embodiment. Referring to FIG. 5, an illustrative system 500 including a computer 510 is shown. The computer 510 may be an implementation of a computing system that includes or corresponds to the user device 102, the second user device 114, the service provider server 120, and/or the POS device 142 of FIG. 1. The computer 510 includes at least one computer processor (CPU) 514 (e.g., a hardware processor) as well as main memory 502, a memory controller 501, and a non-volatile memory 560. The main memory 502 is connected through a memory bus 508 to the memory controller 501. The memory controller 501 and the non-volatile memory 560 are connected through a second memory bus 516 and a bus adapter 518 to the processor 514 through a processor bus 534.

Stored at the memory 502 are one or more applications 520 that may be module(s) or computer program instructions for carrying out particular tasks (e.g., the merchant application 103, the service provider application 104, risk analysis application 116, and/or transaction processing application 118 of FIG. 1). Also stored at the main memory 502 is an operating system 522. Operating systems include, but are not limited to, UNIX® (a registered trademark of The Open Group), Linux® (a registered trademark of Linus Torvalds), Windows® (a registered trademark of Microsoft Corporation, Redmond, Wash., United States), and others as will occur to those of skill in the art. The operating system 522 and the application 520 in the example of FIG. 5 are shown in the main memory 502, but components of the aforementioned software may also, or in addition, be stored at non-volatile memory (e.g., on data storage, such as data storage 524 and/or the non-volatile memory 560).

The computer 510 includes a disk drive adapter 538 coupled through an expansion bus 540 and the bus adapter 518 to the processor 514 and other components of the computer 510. The disk drive adapter 538 connects non-volatile data storage to the computer 510 in the form of the data storage 524 and may be implemented, for example, using Integrated Drive Electronics ("IDE") adapters, Small Computer System Interface ("SCSI") adapters, Serial Attached SCSI ("SAS") adapters, and others as will occur to those of skill in the art. Non-volatile computer memory also may be implemented as an optical disk drive, electrically erasable programmable read-only memory (so-called "EEPROM" or "Flash" memory), RAM drives, and other devices, as will occur to those of skill in the art. In a particular embodiment, the data storage 524 may store the data and information described herein.

The computer 510 also includes one or more input/output ("I/O") adapters 542 that implement user-oriented input/output through, for example, software drivers and computer hardware for controlling input and output to and from user input devices 544, such as keyboards and mice. In addition, the computer 510 includes a communications adapter 546 for data communications with a data communications network 560. The data communications may be carried out serially through Recommended Standard 232 (RS-232) connections (sometimes referred to as "serial" connections), through external buses such as a Universal Serial Bus ("USB"), through data communications networks such as internet protocol (IP) data communications networks, and in other ways as will occur to those of skill in the art. The communications adapter 546 implements the hardware level of data communications through which one computer sends data communications to another computer, directly or through a data communications network. Examples of the communications adapter 546 suitable to use in the computer 510 include, but are not limited to, modems for wired dial-up communications, Ethernet (Institute of Electrical and Electronics Engineers (IEEE) 802.3) adapters for wired network communications, and IEEE 802.11 adapters for wireless network communications. The computer 510 also includes a display adapter 532 that facilitates data communication between the bus adapter 518 and a display device 530, enabling the application 520 to visually present output on the display device 530.

In various embodiments of the present disclosure, execution of instruction sequences to practice the present disclosure may be performed by computer system 500. In various other embodiments of the present disclosure, a plurality of computer systems 500 coupled by communications adapter 546 to the network (e.g., such as a LAN, WLAN, and/or various other wired or wireless networks, including telecommunications, mobile, and cellular phone networks) may perform instruction sequences to practice the present disclosure in coordination with one another.

Particular embodiments described herein may take the form of an entirely hardware embodiment, an entirely software embodiment, or an embodiment containing both hardware and software elements. In a particular embodiment, the disclosed methods are implemented in software that is embedded in processor readable storage medium or storage device and executed by a processor that includes but is not limited to firmware, resident software, microcode, etc.

Further, embodiments of the present disclosure, may take the form of a computer program product accessible from a computer-usable or computer-readable storage device providing program code (e.g., computer-executable instructions) for use by or in connection with a computer, processor, or any instruction execution system. For the purposes of this description, a computer-usable or computer-readable storage device may be non-transitory and can be any apparatus that can tangibly embody a computer program and that can contain, store, communicate, propagate, or transport the program for use by or in connection with the instruction execution system, processor, apparatus, or device.

In various embodiments, the medium can include an electronic, magnetic, optical, electromagnetic, infrared, or semiconductor system (or apparatus or device) or a propagation medium. Examples of a computer-readable storage device include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and digital versatile disk (DVD).

A data processing system suitable for storing and/or executing program code may include at least one processor coupled directly or indirectly to memory elements through a system bus. The memory elements can include local memory employed during actual execution of the program code, bulk storage, and cache memories that may provide temporary or more permanent storage of at least some program code in order to reduce the number of times code must be retrieved from bulk storage during execution.

Input/output or I/O devices (including but not limited to keyboards, displays, pointing devices, etc.) can be coupled to the data processing system either directly or through intervening I/O controllers. Network adapters may also be coupled to the data processing system to enable the data processing system to become coupled to other data processing systems or remote printers or storage devices through intervening private or public networks. Modems, cable modems, and Ethernet cards are just a few of the currently available types of network adapters.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and features as defined by the following claims.

What is claimed is:

1. A system for assessing a risk level of a transaction request, comprising:
one or more processors, one or more non-transitory computer-readable memories, with program instructions stored on the one or more non-transitory computer-readable memories, the one or more processors configured to execute the program instructions to cause the system to perform operations comprising:
determining a first set of database entries that correspond to a network address from a plurality of database entries in a first database, wherein the first set of database entries corresponds to a set of coordinate locations;
determining whether a representative coordinate location is able to be calculated based on a first comparison of a number of entries in the first database to a first threshold and a second comparison of a cluster density associated with the representative coordinate location to a second threshold different from the first threshold;

calculating the representative coordinate location for the network address when the representative coordinate location is determined as able to be calculated;

generating a database entry comprising an association between the network address and the representative coordinate location for storage in a second database different from the first database; and determining an accuracy score corresponding to the representative coordinate location stored in the second database based on an average distance between one or more nearest neighbor locations and the representative coordinate location, wherein a risk level of a transaction request is assessed based at least in part on the accuracy score.

2. The system of claim 1, wherein the determining whether the representative coordinate location is able to be calculated comprises:

determining that a second set of database entries from the first database corresponds to one of a plurality of types of data connections, wherein the second set of database entries has a number of entries that is lesser than that of the first set of database entries;

filtering out the second set of database entries from the plurality of database entries;

determining that an amount of database entries contained in the first set of database entries exceeds the first threshold;

determining the cluster density from the set of coordinate locations; and determining that the cluster density is lesser than the second threshold.

3. The system of claim 2, wherein the determining the cluster density associated with the set of coordinate locations includes:

determining a centroid of the set of coordinate locations;

determining a respective distance between the centroid and each coordinate location of the set of coordinate locations; and determining a maximum distance from the respective distances.

4. The system of claim 1, wherein the calculating the representative coordinate location for the network address includes averaging latitude coordinates in the set of coordinate locations to determine an averaged latitude coordinate and averaging longitude coordinates in the set of coordinate locations to determine an averaged longitude coordinate.

5. The system of claim 1, wherein each of the plurality of database entries in the first database include a particular network address and a corresponding coordinate location.

6. A method comprising:

determining a first set of database entries that correspond to a network address from a plurality of database entries in a first database, wherein the first set of database entries corresponds to a set of coordinate locations;

determining whether a representative coordinate location is able to be calculated based on a first comparison of a number of entries in the first database to a first threshold and a second comparison of a cluster density associated with the representative coordinate location to a second threshold different from the first threshold;

calculating the representative coordinate location for the network address when the representative coordinate location is determined as able to be calculated based on the first comparison satisfying the first threshold and the second comparison satisfying the second threshold; and generating a database entry comprising an association between the network address and the representative coordinate location for storage in a second database different from the first database; and determining an accuracy score corresponding to the representative coordinate location stored in the second database based on an average distance between one or more nearest neighbor locations and the representative coordinate location, wherein a risk level of a transaction request is assessed based at least in part on the accuracy score.

7. The method of claim 6, wherein the determining whether the representative coordinate location can be calculated comprises:

determining that a second set of database entries from the first database corresponds to one of a plurality of types of data connections, wherein the second set of database entries has a number of entries that is lesser than that of the first set of database entries;

filtering out the second set of database entries from the plurality of database entries;

determining that an amount of database entries contained in the first set of database entries exceeds the first threshold;

determining the cluster density from the set of coordinate locations; and determining that the cluster density is lesser than the second threshold.

8. The method of claim 7, wherein the determining the cluster density associated with the set of coordinate locations includes:

determining a centroid of the set of coordinate locations;

determining a respective distance between the centroid and each coordinate location of the set of coordinate locations; and determining a maximum distance from the respective distances.

9. The method of claim 6, wherein the calculating the representative coordinate location for the network address includes averaging latitude coordinates in the set of coordinate locations to determine an averaged latitude coordinate and averaging longitude coordinates in the set of coordinate locations to determine an averaged longitude coordinate.

10. The method of claim 6, wherein each of the plurality of database entries in the first database include a particular network address and a corresponding coordinate location.

11. A computer program product comprising:

one or more non-transitory computer-readable tangible storage devices, and program instructions stored on at least one of the one or more non-transitory computer-readable tangible storage devices, the program instructions when executed cause a machine to perform operations comprising:

determining a first set of database entries that correspond to a network address from a plurality of database entries in a first database, wherein the first set of database entries corresponds to a set of coordinate locations;

determining whether a representative coordinate location is able to be calculated based on a first comparison of a number of entries in the first database to a first threshold and a second comparison of a cluster density associated with the representative coordinate location to a second threshold different from the first threshold;

calculating the representative coordinate location for the network address when the representative coordinate location is determined as able to be calculated based on the first comparison satisfying the first threshold and the second comparison satisfying the second threshold;

generating a database entry comprising an association between the network address and the representative coordinate location for storage in a second database different from the first database; and determining an accuracy score corresponding to the representative coordinate location stored in the second database based on an average distance between one or more nearest neighbor locations and the representative coordinate location, wherein a risk level of a transaction request is assessed based at least in part on the accuracy score.

12. The computer program product of claim 11, the operations further comprising:

determining that a second set of database entries from the first database corresponds to one of a plurality of types of data connections, wherein the second set of database entries has a number of entries that is lesser than that of the first set of database entries;

filtering out the second set of database entries from the plurality of database entries;

determining that an amount of database entries contained in the first set of database entries exceeds the first threshold;

determining the cluster density from the set of coordinate locations; and determining that the cluster density is lesser than the second threshold.

13. The computer program product of claim 12, wherein the determining the cluster density associated with the set of coordinate locations includes:

determining a centroid of the set of coordinate locations;

determining a respective distance between the centroid and each coordinate location of the set of coordinate locations; and determining a maximum distance from the respective distances.

14. The computer program product of claim 11, wherein the calculating the representative coordinate location for the network address includes averaging latitude coordinates in the set of coordinate locations to determine an averaged latitude coordinate and averaging longitude coordinates in the set of coordinate locations to determine an averaged longitude coordinate.

15. The system of claim 1, further comprising:

when the representative coordinate location is determined as not able to be calculated based on the first comparison not satisfying the first threshold or the second comparison not satisfying the second threshold, accessing a third set of database entries from a third database that stores associations between network addresses and location information based on other types of network traffic, wherein the third database is different from the first database and the second database;

determining a database entry in the third set of database entries using the network address as a key, wherein the database entry stores an association between the network address and third-party location information corresponding to the network address; and designating the third-party location information as the representative coordinate location.

16. The system of claim 1, wherein the representative coordinate location comprises an averaged coordinate location from different coordinate locations in the set of coordinate locations.

17. The system of claim 1, further comprising determining the one or more nearest neighbor locations from location information included in the first set of database entries of the first database.

18. The system of claim 1, further comprising determining the one or more nearest neighbor locations from location information included in a second set of database entries of the second database.

19. The system of claim 1, further comprising determining the one or more nearest neighbor locations from location information included in a third set of database entries of a third database different from the first database and the second database.

* * * * *